(12) United States Patent
Hart

(10) Patent No.: US 7,997,393 B2
(45) Date of Patent: Aug. 16, 2011

(54) MAGNETORHEOLOGICAL (MR) ROD GUIDE ASSEMBLY AND MR DAMPER HAVING SAME

(75) Inventor: John A. Hart, Middletown, OH (US)

(73) Assignee: BWI Company Limited S.A., Luxembourg (LU)

( * ) Notice: Subject to any disclaimer, the term of this patent is extended or adjusted under 35 U.S.C. 154(b) by 811 days.

(21) Appl. No.: 12/070,582

(22) Filed: Feb. 20, 2008

(65) Prior Publication Data

US 2009/0205913 A1 Aug. 20, 2009

(51) Int. Cl.
*F16F 9/53* (2006.01)
*F16F 9/36* (2006.01)

(52) U.S. Cl. ............................... 188/267.2; 188/322.17

(58) Field of Classification Search ............. 188/267.1, 188/267.2, 322.16, 322.17
See application file for complete search history.

(56) References Cited

U.S. PATENT DOCUMENTS

| 2,734,521 | A | * | 2/1956 | Hencken | 137/197 |
| 6,883,649 | B2 | * | 4/2005 | Lun | 188/267.2 |
| 2009/0294231 | A1 | * | 12/2009 | Carlson et al. | 188/267.2 |

FOREIGN PATENT DOCUMENTS

| DE | 8007621 U1 | * | 7/1980 |
| EP | 16954 A1 | * | 10/1980 |
| JP | 2009127722 A | * | 6/2009 |

* cited by examiner

*Primary Examiner* — Thomas J Williams
(74) *Attorney, Agent, or Firm* — Dickinson Wright PLLC

(57) ABSTRACT

A magnetorheological (MR) rod guide assembly includes a nonporous MR-rod-guide-assembly housing, annular first and second seals, and a non-annular, porous filter plug. The housing has a through bore. The first and second seals are positioned in the through bore, are adapted to sealingly contact an MR piston rod, and are longitudinally spaced apart defining an inter-seal portion of the through bore. The filter plug is positioned in the housing, has a longitudinal first end in fluid communication with the through bore longitudinally outside the inter-seal bore portion, and has a longitudinal second end in fluid communication with the through bore longitudinally within the inter-seal bore portion.

14 Claims, 4 Drawing Sheets

MAGNETORHEOLOGICAL (MR) ROD GUIDE ASSEMBLY AND MR DAMPER HAVING SAME

TECHNICAL FIELD

The present invention relates generally to magnetorheological devices, and more particularly to a magnetorheological (MR) rod guide assembly and to an MR damper having an MR rod guide assembly.

BACKGROUND OF THE INVENTION

Conventional magnetorheological (MR) dampers include an MR damper having an annular cylinder, an MR piston, an MR piston rod, and an MR rod guide assembly. The annular cylinder has a top end and a bottom end. The MR piston is positioned in the cylinder, and the MR piston rod is attached to the MR piston and has one end extending outside the top end of the cylinder. The MR rod guide assembly includes a housing, two (primary and buffer) annular seals, an annular rod guide (also called a porous insert), a split bearing, and either an annular, plastic, piston-impact bumper or an annular, metallic piston-impact plate, depending on the application, wherein the bumper or plate, in addition to being designed to take up the impact from the piston at rebound, must also be designed to retain the buffer seal and to have added holes for flow to reach the porous insert.

The housing is attached to the cylinder at the top end and has a through bore. The two seals are positioned in the through bore and sealingly contact the MR piston rod. The rod guide is positioned in the through bore and is attached to the housing. The split bearing is positioned in and attached to the rod guide and contacts and slidingly receives the MR piston rod. The primary seal is self-attached and has a lip which is positioned in a seal gland of the housing. A seal retainer attached to the housing secures the buffer seal in the rod guide. The plastic piston-impact bumper is attached to the bottom of the housing.

The annular rod guide is a porous, powdered-metal rod guide which acts as a filter to filter out (e.g., iron) particles in the MR fluid to allow clear fluid to lubricate the MR piston rod as it slides into the bearing. The rod guide is made by expensive machining of a porous, powdered-metal right-circular cylinder to create the annulus including different diameter portions to accommodate the bearing and the buffer seal.

What is needed is an improved magnetorheological (MR) rod guide assembly and an MR damper having an improved MR rod guide assembly.

SUMMARY OF THE INVENTION

A first expression of an embodiment of the invention is for a magnetorheological (MR) rod guide assembly including a nonporous MR-rod-guide-assembly housing, an annular first seal, an annular second seal, and a non-annular, porous filter plug. The housing has a central longitudinal axis and includes a through bore coaxially aligned with the longitudinal axis. The first seal is coaxially aligned with the longitudinal axis, is positioned in the through bore, and is adapted to sealingly contact an MR piston rod. The second seal is coaxially aligned with the longitudinal axis, is positioned in the through bore, is longitudinally spaced apart from the first seal defining an inter-seal bore portion of the through bore, and is adapted to sealingly contact the MR piston rod. The filter plug is positioned in the housing, has a longitudinal first end in a first fluid communication with the through bore longitudinally outside the inter-seal bore portion, and has a longitudinal second end in a second fluid communication with the through bore longitudinally within the inter-seal bore portion.

A second expression of an embodiment of the invention is for a magnetorheological (MR) rod guide assembly including a monolithic, nonporous MR-rod-guide-assembly housing, annular first and second seals, an annular, nonporous rod guide, a split bearing, and a non-annular, cylindrical, porous filter plug. The housing has a central longitudinal axis and includes a through bore coaxially aligned with the longitudinal axis. The first and second seals are positioned in the through bore, are adapted to sealingly contact an MR piston rod, and are longitudinally spaced apart defining an inter-seal portion of the through bore. The first seal is attached to the housing. The rod guide is positioned in the inter-seal portion of the through bore and is attached to the housing. The second seal is self-attached to the rod guide. The split bearing is positioned within and attached to the rod guide and is adapted to contact and slidingly receive the MR piston rod. The porous filter plug is not coaxially aligned with the longitudinal axis, is positioned in the housing radially outward of the rod guide, has a longitudinal first end in fluid communication with the through bore longitudinally outside the inter-seal bore portion, and has a longitudinal second end in fluid communication with the through bore longitudinally within the inter-seal bore portion.

A third expression of an embodiment of the invention is for a magnetorheological (MR) damper including an annular cylinder, an MR piston, an MR piston rod, and an MR rod guide assembly. The cylinder has a top end and a bottom end. The MR piston is positioned in the cylinder. The MR piston rod is attached to the MR piston and has one end extending outside the top end of the cylinder. The MR rod guide assembly includes a monolithic, nonporous MR-rod-guide-assembly housing, annular first and second seals, an annular, nonporous rod guide, a split bearing, and a non-annular, cylindrical, porous filter plug. The housing has a central longitudinal axis, is attached to the cylinder at the top end, and includes a through bore coaxially aligned with the longitudinal axis. The first and second seals are positioned in the through bore, are adapted to sealingly contact the MR piston rod, and are longitudinally spaced apart defining an inter-seal portion of the through bore. The first seal is attached to the housing. The rod guide is positioned in the inter-seal portion of the through bore and is attached to the housing. The second seal is self-attached to the rod guide. The split bearing is positioned within and attached to the rod guide and is adapted to contact and slidingly receive the MR piston rod. The filter plug is not coaxially aligned with the longitudinal axis, is disposed in the housing radially outward of the rod guide, has a longitudinal first end in fluid communication with the through bore outside the inter-seal bore portion, and has a longitudinal second end in fluid communication with the through bore within the inter-seal bore portion.

Several benefits and advantages are derived from one or more of the expressions of an embodiment of the invention. In one example, the rod guide, being nonporous, can be made from a less expensive and more easily machined material compared to a conventional rod guide (porous insert) which is porous and acts as the filter. In the same or a different example, a more compact design of a rod guide assembly is achieved because the second seal is self-retained to the rod guide instead of conventionally requiring a separate seal retainer. In the same or a different example, impact of the piston against the rod guide housing is taken up by a simple, less expensive, annular, metallic, piston-impact plate instead of the more complicated, conventional, bumper or plate designs that also must retain the buffer seal and also must add holes to allow flow to reach the porous insert.

DETAILED DESCRIPTION

Figure 1:
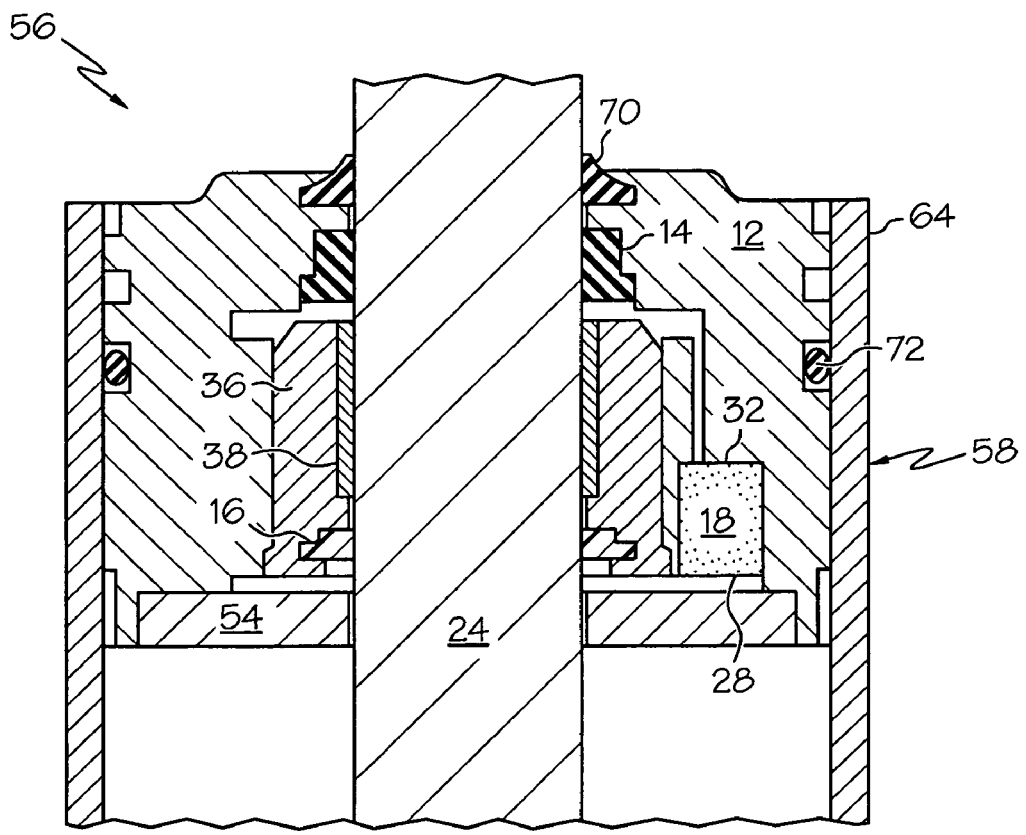
FIG. 1 is a schematic, cross-sectional view of an embodiment of the invention showing an MR damper including an MR rod guide assembly.
Figure 1:
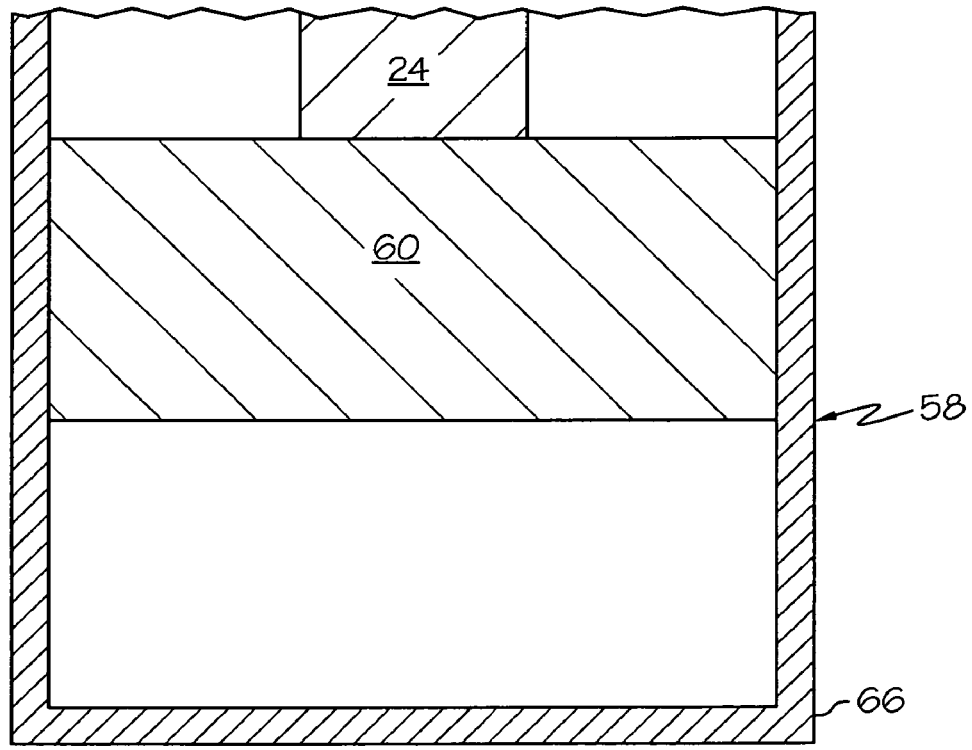
Figure 2:
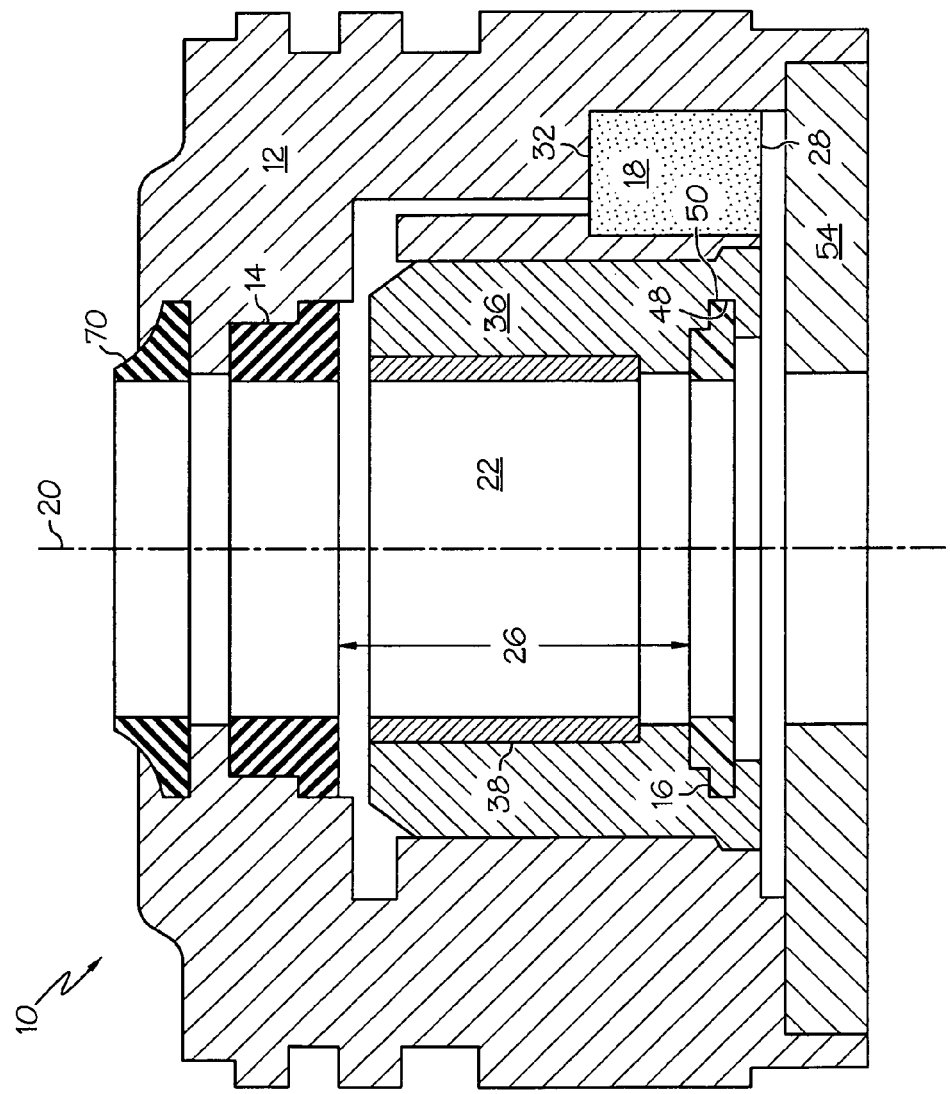
FIG. 2 is a view of the MR rod guide assembly of FIG. 1 without any other components of the MR damper of FIG. 1.
Figure 3:
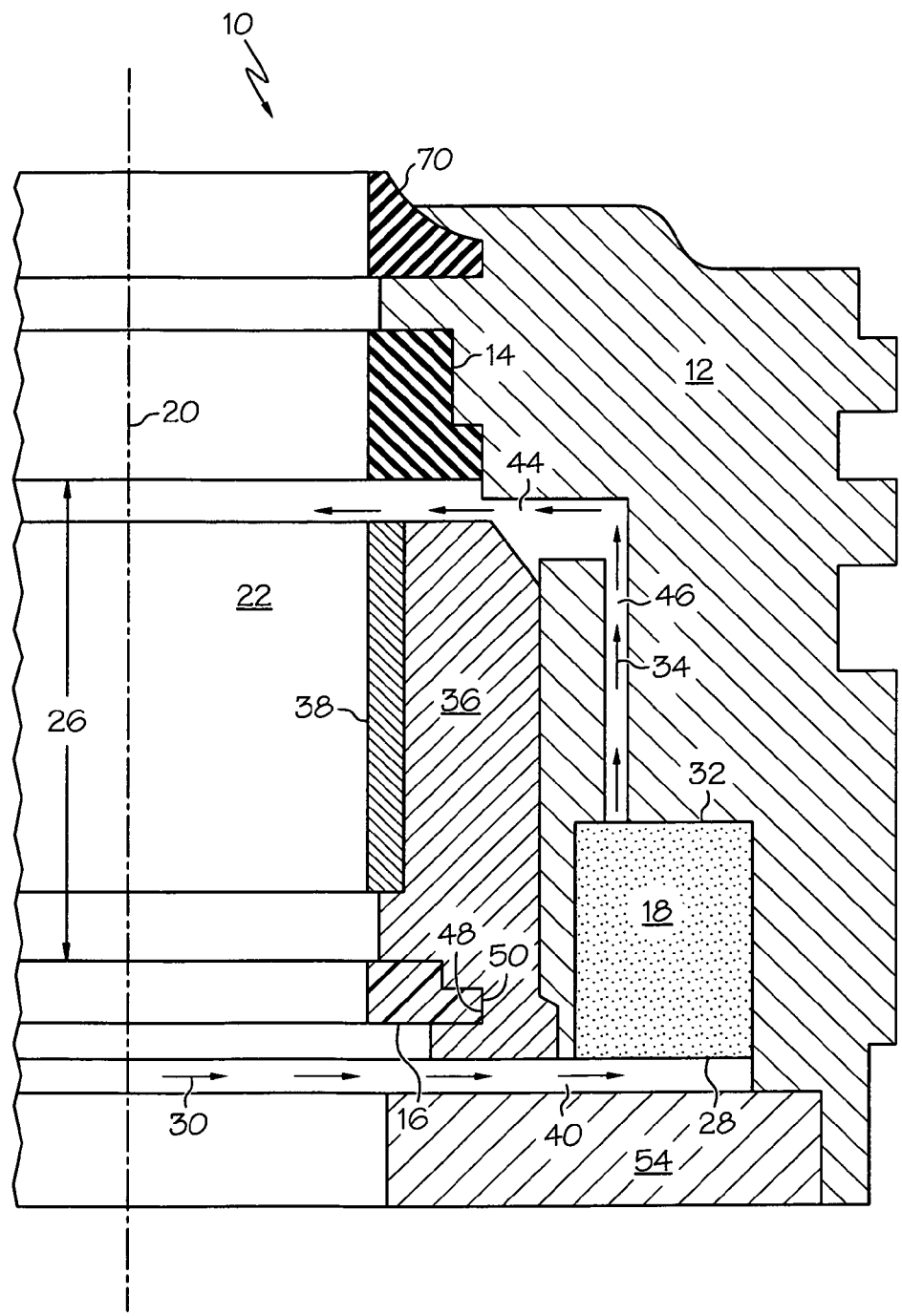
FIG. 3 is an enlarged view of a portion of FIG. 2 showing first and second fluid communications of the filter plug with the through bore.
Figure 4:
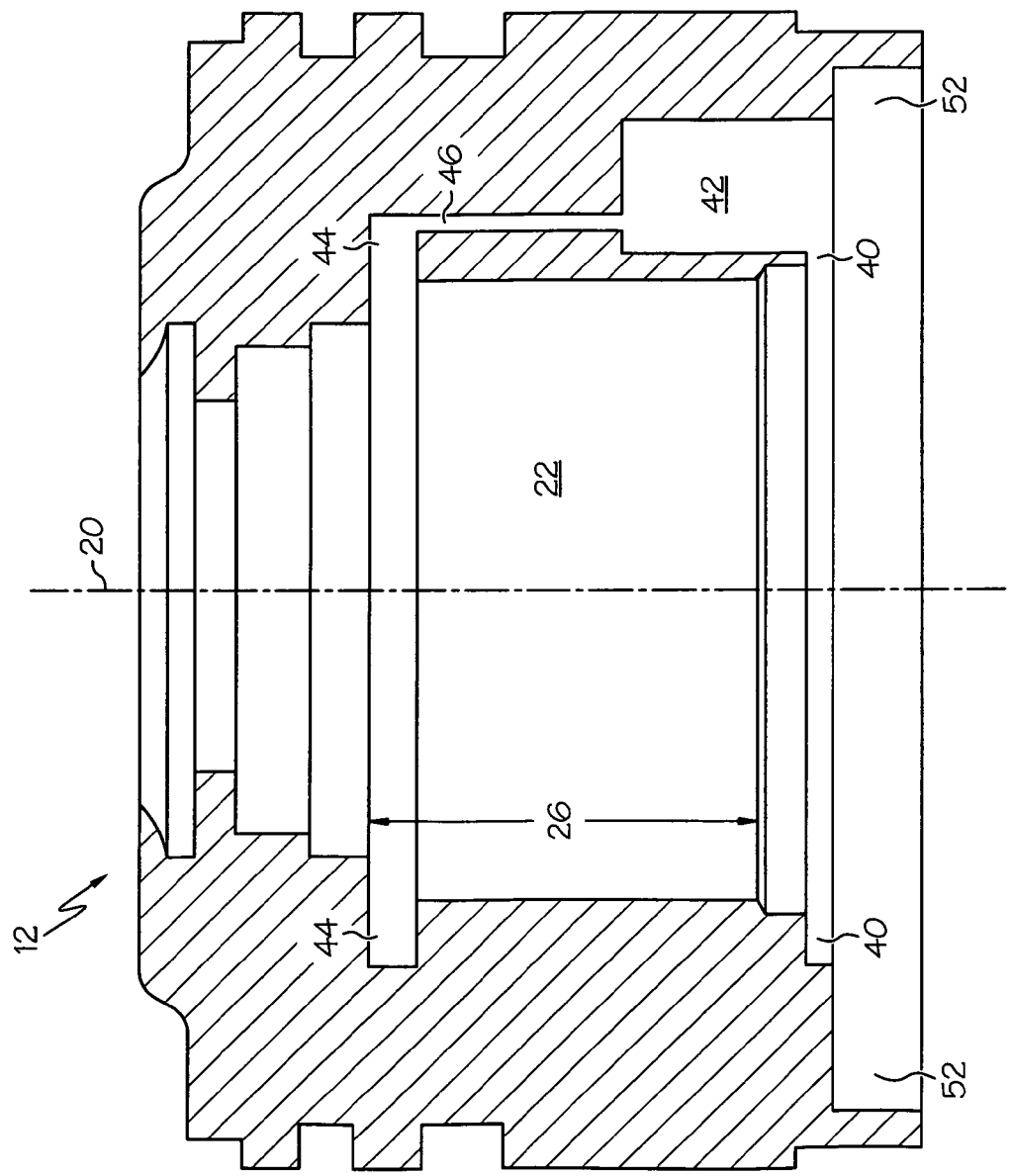
FIG. 4 is a view of the MR-rod-guide-assembly housing of the MR rod guide assembly of FIG. 2 showing the through bore and without any of the other components of the MR rod guide assembly seen in FIG. 2.

Referring now to the drawings, wherein like numerals represent like elements throughout, FIGS. 1-4 show an embodiment of the present invention. A first expression of the embodiment of FIGS. 1-4 is for a magnetorheological (MR) rod guide assembly 10 including a nonporous MR-rod-guide-assembly housing 12, an annular first seal 14, an annular second seal 16, and a non-annular, porous filter plug 18. The housing 12 has a central longitudinal axis 20 and includes a through bore 22 coaxially aligned with the longitudinal axis 20. The first seal 14 is coaxially aligned with the longitudinal axis 20, is disposed in the through bore 22, and is adapted to sealingly contact an MR piston rod 24. The second seal 16 is coaxially aligned with the longitudinal axis 20, is disposed in the through bore 22, is longitudinally spaced apart from the first seal 14 defining an inter-seal bore portion 26 of the through bore 22, and is adapted to sealingly contact the MR piston rod 24. The filter plug 18 is disposed in the housing 12, has a longitudinal first end 28 in a first fluid communication 30 (shown by a dashed arrowhead lines) with the through bore 22 longitudinally outside the inter-seal bore portion 26, and has a longitudinal second end 32 in a second fluid communication 34 (shown by a dashed arrowhead lines) with the through bore 22 longitudinally within the inter-seal bore portion 26.

It is noted that the terminology "coaxially aligned" means substantially coaxially aligned, and that the terminology "sealingly contact" means to contact in a substantially sealing manner.

In one construction of the first expression of the embodiment of FIGS. 1-4, the filter plug 18 consists essentially of powdered metal. In one variation, the filter plug 18 has a shape of a substantially right-circular cylinder. In the same or a different variation, the filter plug 18 consists of essentially powdered steel, such as powdered stainless steel. Other shapes and compositions of the porous filter plug are left to those skilled in the art. In one modification, the housing 12 consists essentially of nonporous aluminum, the first seal 14 consists essentially of NBR (nitrile-butadiene rubber), and the second seal 16 consists essentially of plastic.

A second expression of the embodiment of FIGS. 1-4 is for a magnetorheological (MR) rod guide assembly 10 including a monolithic, nonporous MR-rod-guide-assembly housing 12, annular first and second seals 14 and 16, an annular, nonporous rod guide 36, a split bearing 38, and a non-annular, cylindrical, porous filter plug 18. The housing 12 has a central longitudinal axis 20 and includes a through bore 22 coaxially aligned with the longitudinal axis 20. The first and second seals 14 and 16 are disposed in the through bore 22, are adapted to sealingly contact an MR piston rod 24, and are longitudinally spaced apart defining an inter-seal portion 26 of the through bore 22. The first seal 14 is attached (such as self-attached) to the housing 12. The rod guide 36 is disposed in the inter-seal portion 26 of the through bore 22 and is attached (such as self-attached) to the housing 12. The second seal 16 is self-attached to the rod guide 36. The split bearing 38 is disposed within and attached (such as self-attached) to the rod guide 36 and is adapted to contact and slidingly receive the MR piston rod 24. The filter plug 18 is not coaxially aligned with the longitudinal axis 20, is disposed in the housing 12 radially outward of the rod guide 36, has a longitudinal first end 28 in fluid communication with the through bore 22 longitudinally outside the inter-seal bore portion 26, and has a longitudinal second end 32 in fluid communication with the through bore 22 longitudinally within the inter-seal bore portion 26.

A "self-attached seal" is a seal which is attached without a seal retainer. Examples of self-attaching annular seals include, without limitation, spring-biased elastomeric seals and resilient plastic seals self attached to nonporous members. Examples of a self-attaching non-seals include, without limitation, resilient, open-biased split bearings and press-fit nonporous rod guides. Other examples are left to the artisan.

In one construction of the second expression of the embodiment of FIGS. 1-4, the filter plug 18 consists essentially of powdered metal. In the same or a different construction, the filter plug 18 has a shape of a substantially right-circular cylinder.

In one variation, the through bore 22 has a first transversely-outwardly-extending portion 40 which is disposed longitudinally outside the inter-seal bore portion 26 and proximate the second seal 16. By "transversely-outwardly-extending" is meant extending outwardly in a direction substantially perpendicular to the longitudinal axis 20. In this variation, the housing 12 has a longitudinally-facing recess 42 which is open to the first transversely-extending portion 40. In this variation, the filter plug 18 is disposed in the recess 42 and is attached (such as self attached by a press fit) to the housing 12.

In one modification, the through bore 22 has a second transversely-outwardly-extending portion 44 which is disposed longitudinally inside the inter-seal bore portion 26 and proximate the first seal 14. In this modification, the housing 12 includes an internal fluid passage 46 extending longitudinally from the recess 42 to the second transversely-outwardly-extending portion 44.

In one arrangement, the rod guide 36 includes a first seal gland 48, and the second seal 16 has a lip 50 which is disposed in the first seal gland 48. In one choice of materials, the rod guide 36 consists essentially of nonporous aluminum or nonporous steel.

In one illustration, the through bore 22 includes a third transversely-outwardly-extending portion 52 which longitudinally abuts and extends further (i.e., which extends transversely-outwardly further) than the second transversely-outwardly-extending portion 44, wherein the second transversely-outwardly-extending portion 44 is disposed longitudinally between the rod guide 36 and the third transversely-outwardly-extending portion 52. In this illustration, the MR rod guide assembly 10 also includes an annular, metallic piston-impact plate 54 coaxially aligned with the longitudinal axis 28, disposed in the third transversely-outwardly-extending portion 52, and attached to the housing 12, wherein the piston-impact plate 54 is devoid of any hole which does not intersect the longitudinal axis 28. In one choice of materials, the impact plate 54 consists essentially of nonporous steel. In one enablement, the housing 12 is radially peened to secure the impact plate 54 to the housing 12.

A third expression of the embodiment of FIGS. 1-4 is for a magnetorheological (MR) damper 56 including an annular cylinder 58, an MR piston 60, an MR piston rod 24, and an MR rod guide assembly 10. The cylinder 58 has a top end 64 and a bottom end 66. It is noted that the terms "top" and "bottom" are used merely to distinguish between the two ends of the cylinder 58 and not to describe the orientation of the cylinder 58. The MR piston 60 is positioned in the cylinder 58. The MR piston rod 24 is attached to the MR piston 60 and has one end extending outside the top end 64 of the cylinder 58. The MR rod guide assembly 10 includes a monolithic, nonporous MR-rod-guide-assembly housing 12, annular first and second seals 14 and 16, an annular, nonporous rod guide 36, a split bearing 38, and a non-annular, cylindrical, porous filter plug 18. The housing 12 has a central longitudinal axis 20, is attached to the cylinder 58 at the top end 64, and includes a through bore 22 coaxially aligned with the longitudinal axis 20. The first and second seals 14 and 16 are positioned in the through bore 22, are adapted to sealingly contact the MR piston rod 24, and are longitudinally spaced apart defining an inter-seal portion 26 of the through bore 22. The first seal 14 is attached (such as self-attached) to the housing 12. The rod guide 36 is disposed in the inter-seal portion 26 of the through bore 22 and is attached (such as self-attached) to the housing 12. The second seal 16 is self-attached to the rod guide 36. The split bearing 38 is positioned within and attached (such as self-attached) to the rod guide 36 and is adapted to contact and slidingly receive the MR piston rod 24. The filter plug 18 is not coaxially aligned with the longitudinal axis 20, is disposed in the housing 12 radially outward of the rod guide 36, has a longitudinal first end 28 in fluid communication with the through bore 22 outside the inter-seal bore portion 26, and has a longitudinal second end 32 in fluid communication with the through bore 22 within the inter-seal bore portion 26.

In one enablement of the third expression of the embodiment of FIGS. 1-4, the first seal 14 (sometimes called the primary seal) is disposed closer to the top end 64 of the cylinder 58, and the second seal 16 (sometimes called the buffer seal) is disposed closer to the bottom end 66 of the cylinder 58. In one variation, the MR rod guide assembly 10 also includes a third seal 70 (sometimes called the wiper seal), wherein the first seal 14 is disposed longitudinally between the third seal 70 and the second seal 16. In one choice of materials, the third seal 70 consists essentially of NBR. In one modification, at least one elastomeric O-ring seal 72 is disposed radially between and in contact with the housing 12 and the cylinder 58. In one example, MR fluid (not shown) is disposed in the cylinder 58 between and in contact with the bottom end 66 of the cylinder 58 and the MR rod guide assembly 10. In one illustration, the rod guide 36 is a monolithic rod guide, and the filter plug 18 is a monolithic filter plug. In one realization, the recess 42 is a wider hole drilled in the housing 12, and the internal fluid passage 46 is a narrower hole drilled in the housing 12 from the recess 42. The number of narrower holes is left to the artisan.

It is noted that the constructions, variations, modifications, etc. of the second expression of the embodiment of FIGS. 1-4 are equally applicable to the third expression of the embodiment of FIGS. 1-4.

Several benefits and advantages are derived from one or more of the expressions of an embodiment of the invention. In one example, the rod guide, being nonporous, can be made from a less expensive and more easily machined material compared to a conventional rod guide (porous insert) which is porous and acts as the filter. In the same or a different example, a more compact design of a rod guide assembly is achieved because the second seal is self-retained to the rod guide instead of conventionally requiring a separate seal retainer. In the same or a different example, impact of the piston against the rod guide housing is taken up by a simple, less expensive, annular, metallic, piston-impact plate instead of the more complicated, conventional, bumper or plate designs that also must retain the buffer seal and also must add holes to allow flow to reach the porous insert.

The foregoing description of several expressions of embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A magnetorheological (MR) rod guide assembly comprising:
   a) a monolithic, nonporous MR-rod-guide-assembly housing having a central longitudinal axis and including a through bore coaxially aligned with the longitudinal axis;
   b) annular first and second seals disposed in the through bore, adapted to sealingly contact an MR piston rod, and longitudinally spaced apart defining an inter-seal portion of the through bore, wherein the first seal is attached to the housing;
   c) an annular, nonporous rod guide disposed in the inter-seal portion of the through bore and attached to the housing, wherein the second seal is self-attached to the rod guide;
   d) a split bearing disposed within and attached to the rod guide and adapted to contact and slidingly receive the MR piston rod; and
   e) a non-annular, cylindrical, porous filter plug which is not coaxially aligned with the longitudinal axis, which is disposed in the housing radially outward of the rod guide, which has a longitudinal first end in a fluid communication with the through bore longitudinally outside the inter-seal bore portion, and which has a longitudinal second end in fluid communication with the through bore longitudinally within the inter-seal bore portion.

2. The MR rod guide assembly of claim 1, wherein the filter plug consists essentially of powdered metal.

3. The MR rod guide assembly of claim 1, wherein the filter plug has a shape of a substantially right-circular cylinder.

4. The MR rod guide assembly of claim 3, wherein the through bore has a first transversely-outwardly-extending portion which is disposed longitudinally outside the inter-seal bore portion and proximate the second seal, wherein the housing has a longitudinally-facing recess which is open to the first transversely-extending portion, and wherein the filter plug is disposed in the recess and attached to the housing.

5. The MR rod guide assembly of claim 4, wherein the through bore has a second transversely-outwardly-extending portion which is disposed longitudinally inside the inter-seal bore portion and proximate the first seal, and wherein the housing includes an internal fluid passage extending longitudinally from the recess to the second transversely-outwardly-extending portion.

6. The MR rod guide assembly of claim 5, wherein the rod guide includes a first seal gland, and wherein the second seal has a lip which is disposed in the first seal gland.

7. The MR rod guide assembly of claim 6, wherein the through bore includes a third transversely-outwardly-extending portion which longitudinally abuts and extends further than the second transversely-outwardly-extending portion, wherein the second transversely-outwardly-extending portion is disposed longitudinally between the rod guide and the third transversely-outwardly-extending portion, and also including an annular, metallic piston-impact plate coaxially aligned with the longitudinal axis, disposed in the third transversely-outwardly-extending portion, and attached to the housing, wherein the piston—impact plate is devoid of any hole which does not intersect the longitudinal axis.

8. A magnetorheological (MR) damper comprising:
  a) an annular cylinder having a top end and a bottom end;
  b) an MR piston disposed in the cylinder;
  c) an MR piston rod attached to the MR piston and having one end extending outside the top end of the cylinder; and
  d) an MR rod guide assembly including:
    (1) a monolithic, nonporous MR-rod-guide-assembly housing having a central longitudinal axis, attached to the cylinder at the top end, and including a through bore coaxially aligned with the longitudinal axis;
    (2) annular first and second seals disposed in the through bore, adapted to sealingly contact the MR piston rod, and longitudinally spaced apart defining an inter-seal portion of the through bore, wherein the first seal is attached to the housing;
    (3) an annular, nonporous rod guide disposed in the inter-seal portion of the through bore and self-attached to the housing, wherein the second seal is self-attached to the rod guide;
    (4) a split bearing disposed within and attached to the rod guide and adapted to contact and slidingly receive the MR piston rod; and
    (5) a non-annular, cylindrical, porous filter plug which is not coaxially aligned with the longitudinal axis, which is disposed in the housing radially outward of the rod guide, which has a longitudinal first end in fluid communication with the through bore outside the inter-seal bore portion, and which has a longitudinal second end in fluid communication with the through bore within the inter-seal bore portion.

9. The MR damper of claim 8, wherein the filter plug consists essentially of powdered metal.

10. The MR damper of claim 8, wherein the filter plug has a shape of a substantially right-circular cylinder.

11. The MR damper of claim 10, wherein the through bore has a first transversely-outwardly-extending portion which is disposed longitudinally outside the inter-seal bore portion and proximate the second seal, wherein the housing has a longitudinally-facing recess which is open to the first transversely-extending portion, and wherein the filter plug is disposed in and attached to the recess.

12. The MR damper of claim 11, wherein the through bore has a second transversely-outwardly-extending portion which is disposed longitudinally inside the inter-seal bore portion and proximate the first seal, and wherein the housing includes an internal fluid passage extending longitudinally from the recess to the second transversely-outwardly-extending portion.

13. The MR damper of claim 12, wherein the rod guide includes a first seal gland, and wherein the second seal has a lip which is disposed in the first seal gland.

14. The MR damper of claim 13, wherein the through bore includes a third transversely-outwardly-extending portion which longitudinally abuts and extends further than the second transversely-outwardly-extending portion, wherein the second transversely-outwardly-extending portion is disposed longitudinally between the rod guide and the third transversely-outwardly-extending portion, and also including an annular, metallic piston-impact plate coaxially aligned with the longitudinal axis, disposed in the third transversely-outwardly-extending portion, and attached to the housing, wherein the piston-impact plate is devoid of any hole which does not intersect the longitudinal axis.

* * * * *